United States Patent [19]

Barton et al.

[11] 4,299,522
[45] Nov. 10, 1981

[54] TRACTOR-MOUNTABLE FRONT AND REAR BALE-IMPALING HAY-CARRIERS

[75] Inventors: Roy C. Barton, 724 Main St., Mt. Vernon, Ill. 62864; Dale A. Smith, Mt. Vernon, Ill.

[73] Assignee: Roy C. Barton, Waltonville, Ill.

[21] Appl. No.: 82,655

[22] Filed: Oct. 9, 1979

[51] Int. Cl.³ .............................................. A01D 87/12
[52] U.S. Cl. .................................. 414/24.5; 414/686; 414/703
[58] Field of Search .............. 414/24.5, 24.6, 684–686, 414/703, 721, 911; 37/2 R

[56] References Cited

U.S. PATENT DOCUMENTS

| | | | |
|---|---|---|---|
| 3,145,781 | 8/1964 | Rogler | 414/685 X |
| 3,934,726 | 1/1976 | Martin | 414/24.5 |
| 4,040,534 | 8/1977 | Kenworthy | 414/703 |
| 4,051,962 | 10/1977 | Westendorf | 414/686 |
| 4,120,405 | 10/1978 | Jones et al. | 414/911 X |

FOREIGN PATENT DOCUMENTS

| | | | |
|---|---|---|---|
| 1209193 | 2/1960 | France | 414/685 |
| 1548029 | 7/1979 | United Kingdom | 414/24.5 |

*Primary Examiner*—Trygve M. Blix
*Assistant Examiner*—Terrance L. Siemens
*Attorney, Agent, or Firm*—Ralph F. Staubly

[57] ABSTRACT

A commercially available farm tractor having a rear-mounted upwardly swingable power lift, is provided with a pair of hay-bale-penetrating tines rigidly parallelly connected at their base ends by a member that is easily and quickly detachably mountable on the free ends of parallel lift arms. A delta-shaped frame is attached to the front of the tractor to carry a second pair of parallel bale-impaling tines which are upwardly swingable by a single hydraulic cylinder. The assemblage provides quick and easy loading and unloading of two bales, and a weight-balanced load during carrying.

1 Claim, 5 Drawing Figures

TRACTOR-MOUNTABLE FRONT AND REAR BALE-IMPALING HAY-CARRIERS

BACKGROUND AND OBJECTS OF THE INVENTION

It is known to provide tractors with numerous front- or rear-mounted parallel tines operable by power-lifts for sliding under loads and then upwardly tilting the load for carrying it (e.g. U.S. Pat. Nos. to McClenny 2,727,640 and 3,427,640 to Clatterbuck). But it is not known to provide a farm-type tractor with power-tiltable front and rear pairs of parallel bale-impaling tines for easy loading and unloading and for weight-balancing the load during carrying. It is the principal object of this invention to provide such an assemblage. Other objects and advantages will become apparent as the following detailed description proceeds.

BRIEF DESCRIPTIONS OF THE DRAWING FIGURES

DETAILED DESCRIPTION

With reference now to the drawings, the letter T generally designates a commercially available farm-type tractor having a conventional rear-mounted two-arm power-lift L, and having an added-on front-attached power-lift F.

Figure 1:
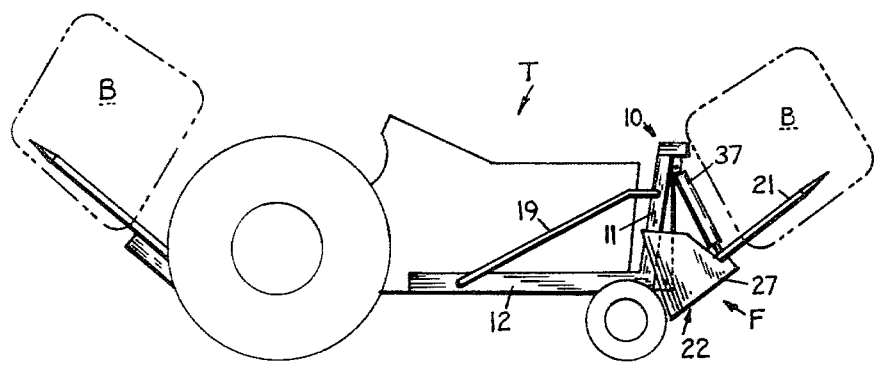
FIG. 1 is a side elevational view of a preferred embodiment of the invention.

The front power-lift F comprises a delta-shaped frame 10 formed by two inclined side elements 11, two rearwardly extending elements 12, a horizontal front tubular base element 13, an upright element 15 and a cap element 17 all welded together at their junctions. The elements 12 are bolted (FIG. 1) or otherwise fixed to the side chassis elements of the tractor T. Two curved bracing tubular elements 19 are welded at their ends to the delta-shaped frame and to the elements 12 (FIG. 1).

Figure 2:
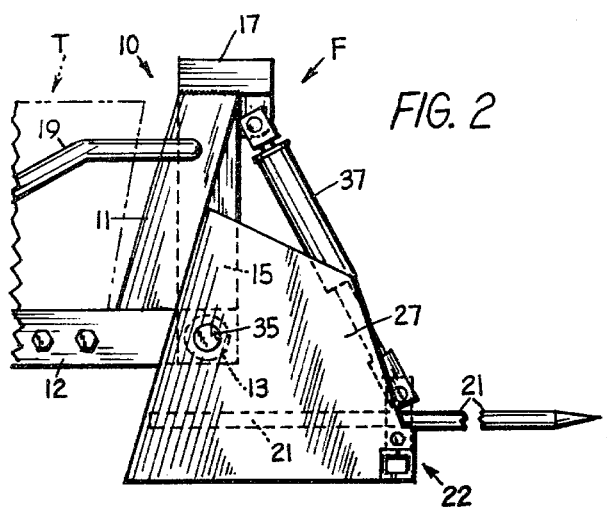
FIG. 2 is an enlarged fragmentary side elevational view of the front loader assemblage of FIG. 1.
Figure 3:
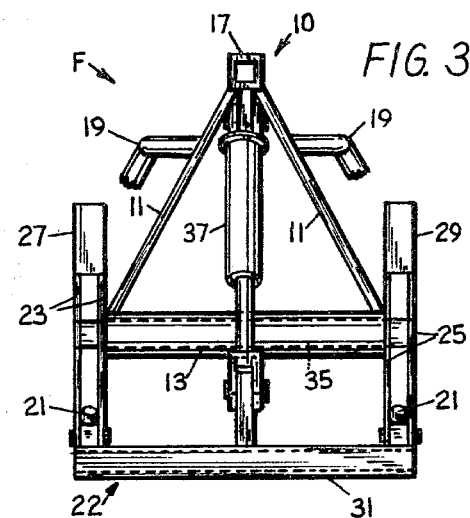
FIG. 3 is a front elevational view of the FIG. 2 structure.
Figure 4:
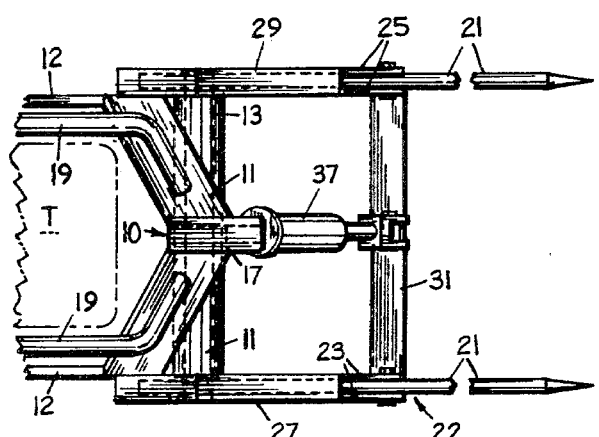
FIG. 4 is a plan view of the FIG. 2 disclosure.

Two parallel pointed tubular tines 21 are mounted on a frame 22 formed of two pairs of side plates 23 and 25 interconnected to form upright narrow box-like members 27 and 29 into the bottom of which the rear ends of the tines 21 are fastened. The members are transversely braced by a front angle-plate 31 and by a tube 13 surrounding a shaft 35 journaled in bearings in the side frame elements 11. The outer ends of the shaft 35 are welded to the box-like members 27 and 29 for pivotally connecting the frame 22 and its tines 21 to their support frame 10. A hydraulic cylinder 37 connects the transverse plate 31 to the upper parts of the frame 10 for swinging the tines from their horizontal bale-penetrating position of FIG. 2 to their upwardly tilted bale-carrying position of FIG. 1.

Figure 5:
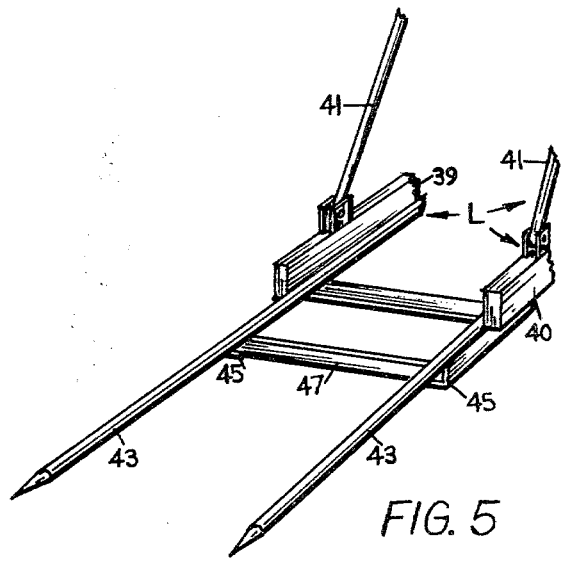
FIG. 5 is a perspective view of the rear assemblage of FIG. 1.

The rear-mounted bale-carrier R (FIGS. 1 and 5) is mounted on the free ends of a conventional lift L comprising two parallel arms 39 and 40 pivotally connected by known means (not shown) to the chassis of the tractor T and operated by a pair of tractor-energized arms 41. The rear bale-carrier R comprises a pair of parallel pointed tubular bale-impaling tines 43. The tines 43 are welded to a pair of angle-bars 45 which are cross-braced by a pair of angle-bars 47 and 49 welded thereto.

The invention having been described, what is claimed is:

1. The combination of (A) a farm-type tractor having a laterally disposed and rearwardly extending hydraulically powered lifting arm on each side thereof, with (B) easily detachable structures for converting said tractor into a front-and-rear load-balanced hay-bale carrier, said detachable structures comprising: a first parallel pair of pointed hay-bale-impaling tines rigidly attached to the rear ends of said powered lifting arms, substantially as extensions thereof, to constitute a rear bale-carrier, an upright delta-shaped rigid frame spanning and close to the front of said tractor; a horizontally disposed bar bolted to each side of the chassis of said tractor and fixed at its front end to a lower portion of said delta-shaped frame; a bracing bar rigidly connecting each said horizontally disposed bar to an upper portion of said delta-shaped frame; a second parallel pair of pointed hay-bale-impaling tines pivotally connected each to an opposite lower lateral portion of said delta-shaped frame and extending forwardly therefrom; and a hydraulic cylinder operatively connected between an upper portion of said delta-shaped frame and said second pair of tines toward their rear ends for swinging them upwardly to lift and carry a hay bale by and on said tines after their horizontal penetration into said hay bale.

* * * * *